Dec. 4, 1934.    J. K. JAMISON    1,982,874
METHOD OF TAPERING TUBES
Filed Aug. 12, 1933    2 Sheets-Sheet 1
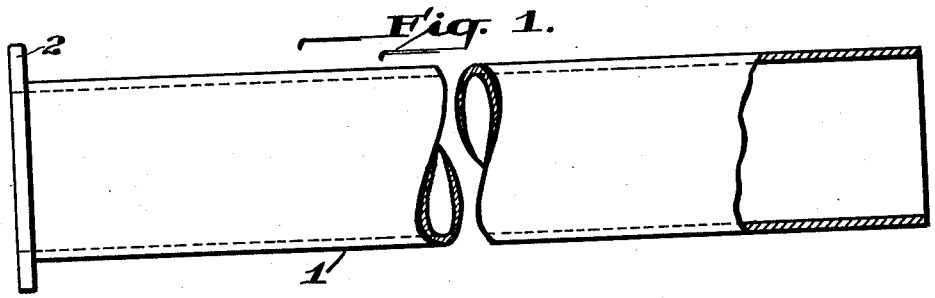
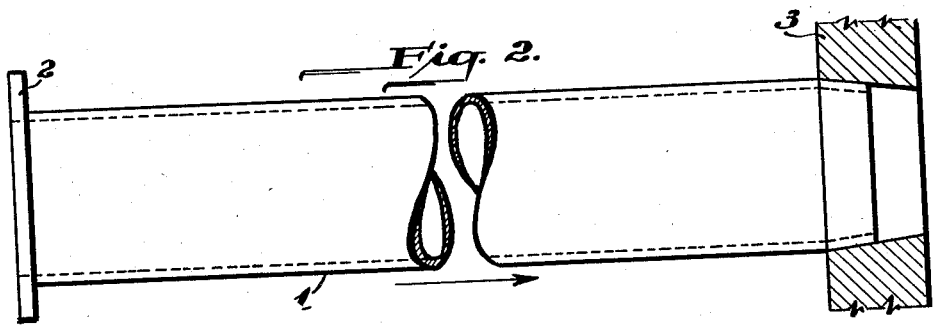
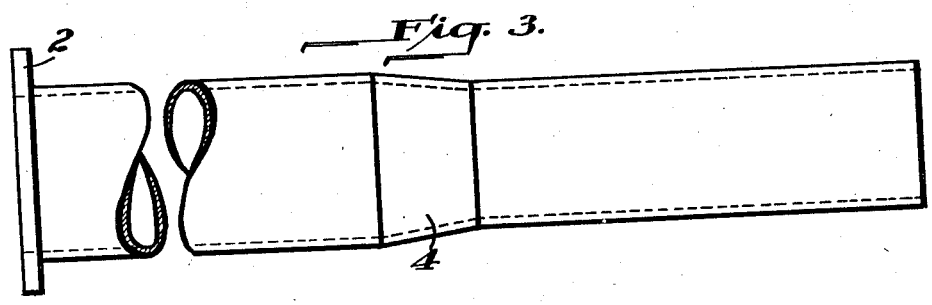
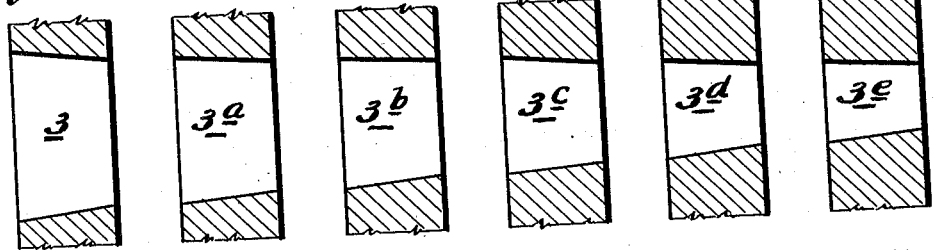
WITNESSES
INVENTOR;
John Kenneth Jamison,
By Brown, Critchlow & Flick
attorneys Dec. 4, 1934.  J. K. JAMISON  1,982,874
METHOD OF TAPERING TUBES
Filed Aug. 12, 1933  2 Sheets-Sheet 2
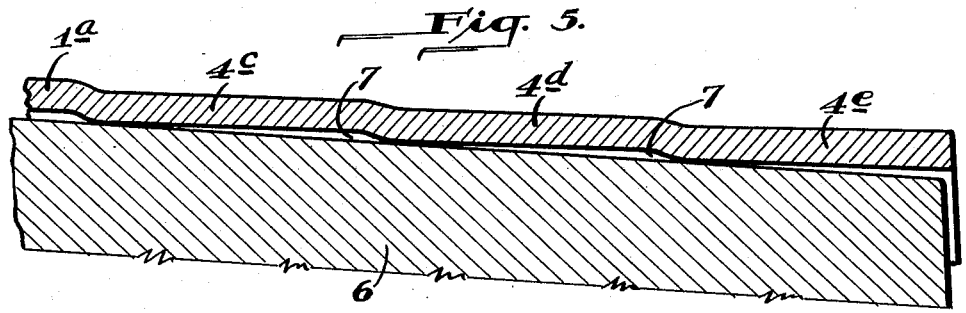
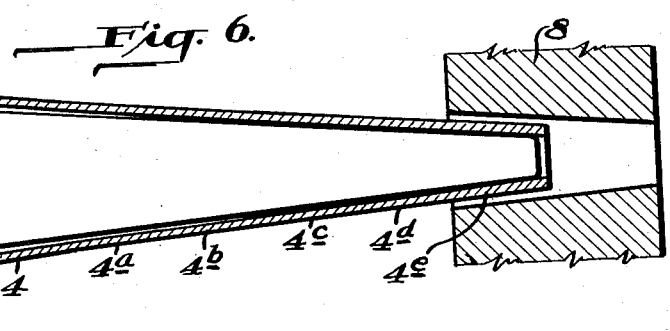
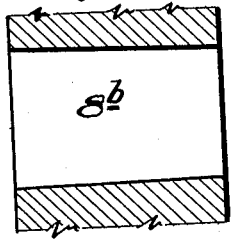 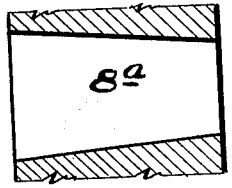 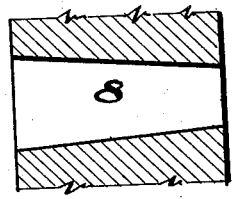
John Kenneth Jamison
INVENTOR Patented Dec. 4, 1934

1,982,874

UNITED STATES PATENT OFFICE 1,982,874

METHOD OF TAPERING TUBES

John Kenneth Jamison, Monessen, Pa., assignor to Hamilton Standard Propeller Company, Hartford, Conn., a corporation of Delaware Application August 12, 1933, Serial No. 684,843

13 Claims. (Cl. 29—156)

This invention relates to the manufacture of aeronautical propellers, and it has to do especially with the tapering and accurate sizing of tubular blanks for use in making the blades of such propellers.

Among the objects of the invention are to provide means and methods for working one end of a metal tube so as to produce a uniformly tapered end portion having an exactly sized interior, without such distortion or creasing of the tube wall as to impair its strength, and with a minimum of surface irregularity due to thickening of the wall by reduction of diameter.

In the production of aeronautical propellers it is important to obtain uniform mass distribution in the blades in order to avoid the setting up of unbalanced stresses in use. Particularly is this true of propellers comprising detachable blades adjustably mounted in a separate hub structure. It is highly important that each of such blades should weigh the same and have the same mass distribution as every other blade of the same size and type.

In the case of hollow blades made from tubes, it has been found that in order to get exact mass distribution it is highly important, if not essential, to produce a blank having an exactly predetermined internal diameter at any given station, and an exact predetermined taper in the non-cylindrical portion of the blank.

The present invention may be described in connection with the accompanying drawings, in which Figure 1 is a longitudinal view, partly in section, of a seamless tubular blank for use in the practice of this invention; Fig. 2 a view of the tube in the course of being subjected to the first step of the process; Fig. 3 a view of the tube shown in Fig. 2 after the completion of the operation indicated as in progress therein; Figs. 4, 4a, 4b, 4c, 4d and 4e are sectional views of a series of sinking dies for use in connection with the step indicated in Figs. 2 and 3; Fig. 5 a fragmentary sectional view showing in exaggerated manner the blank after it has been acted upon by the series of dies shown in Fig. 4; Fig. 6 a longitudinal sectional view through the blank in the process of being swaged; Figs. 7, 7a and 7b are sectional views of swaging dies used in completing the taper; and Fig. 8 a longitudinal view, partly in section, showing the blank with the interior sizing completed.

Generally speaking the means and methods herein claimed as my invention comprise the use of a preliminary series of tapered ring dies, each smaller than and of slightly reduced taper compared to the preceding one, and having interiors that in the aggregate substantially define the exterior taper which it is intended to impose on the cylindrical tubular blank. The largest of these dies is used first, the tube being forced through it until the die reaches the point on the blank where the taper is to commence. Then the next smaller die is forced over the reduced cylindrical portion beyond the tapered step left by the final positioning of the largest die. The second die is moved to final position to form a second tapered step substantially continuous with that produced by the first die. This process is repeated with each of the dies, in order of size. The final result is a tapered swaged or die-sunk end of predetermined slope and size on the tube, with slight differences in the taper of the successive steps.

Then a mandrel having exactly the size and taper desired for the interior of the tubular blank is placed in the tube, and the tube seated on the mandrel is again forced into a final series of tapered ring dies which swage the tube down on the mandrel, while elongating and straightening the stepped walls of the tapered portion. The final result is that the tapered portion of the blank is reduced to the exact internal taper and size determined by the mandrel.

Having reference now to the drawings, a tube 1, Fig. 1, adapted to form a single propeller blade of the detachable type, is worked at one end to form terminal flange 2. This may be done by any suitable operation, and preferably but not necessarily the flange is formed before tapering the tube.

The tip end of the tube opposite flange 2, is then reduced radially in tapered steps of progressively decreasing diameter by cold-sinking the hollow tube, i. e., without a mandrel, in a series of dies, 3, 3a, etc., of progressively decreasing size. Fig. 2 shows tube 1 being sunk in the largest tapered die 3, the diameter of whose inlet opening corresponds to that of the exterior of the tube. The tube is forced through the die 4, (Fig. 3) at a distance from the end of the tube to provide an ultimate taper of the desired length. The reduced cylindrical portion of the blank is then successively reduced in a number of further similar tapered steps in the dies 3a, 3b, 3c, 3d, and 3e (Fig. 4). The inlet opening of each of these dies corresponds approximately in diameter to the outlet of the next preceding die. Each of these dies acts upon the tube up to the end of the preceding tapered step, die 3e forming the last tapered step at the tip of the tube.

Thus there is provided a blank 1a (Figs. 5 and 6) having a continuous series of tapered adjoining steps 4, 4a, 4b, etc., of progressively decreasing diameter, each step being of a slightly reduced taper compared to the next larger step. In actual practice the discontinuity between successive tapered steps is not sharply defined, although the reduction is apparent. The stepped character of the tapered portion may, however, be observed by placing a straight edge along its side. For purposes of illustration and description the stepwise reduction is shown on an exaggerated scale in Fig. 5.

There is next inserted in blank 1a a mandrel 5 having a tapered tip 6, the dimensions of which correspond to the final internal dimensions desired in the tapered part of the blank. As seen in Figs. 5 and 6, sinking dies 3, 3a, etc., conform to the reduced portion generally but not exactly to the desired final taper. This permits the mandrel to be inserted with a neat fit. The tapered tip 6 of the mandrel does not make continuous contact with the interior of the reduced portion of the blank because of the step-like character of the latter, but on the contrary makes contact only at spaced intervals, such as near the inner end of each step. This leaves intermediate spaces or pockets 7 (Fig. 5) between the mandrel and the inner wall of the blank.

The blank is now forced over and down on the mandrel by driving it into tapered swaging dies 8, 8a, and 8b successively. These dies are tapered and their outlet and inlet openings are correlated in the manner described for the preliminary sinking dies 3, 3a, etc.

This final swaging operation is performed by positioning the tapered end of the blank in the dies 8, 8a, 8b, in turn, and then driving the mandrel with successive heavy blows until the tube has been stretched and swaged and driven onto the mandrel to bring the interior down to the shape of the mandrel in the die. Pockets 7 provide a space for free flow of the adjacent metal when deformed in the swaging dies. Thus the metal does not back up and resist plastic deformation, and the swaging die and mandrel cooperate to produce a smooth external and internal taper 9, Fig. 8, conforming to the mandrel tip and die, and therefore accurately sized internally.

After the final swaging operation has been completed, the mandrel slides freely from within the blank. It is desirable to lubricate the mandrel and the outer surface of the blank during the swaging operations, and the manner in which the metal has conformed itself to the mandrel may be observed from the lubricant distribution over the mandrel tip when it is slipped out at the end of the swaging step. The uniformity of metal flow shows in the lines made in the lubricant by flow and by the internal surface of the blank.

This method produces blanks in which internal machining operations are substantially eliminated, because the taper is accurately sized internally, and because the metal is deformed smoothly and uniformly. The processes described produce accurately sized and tapered tubes, but the wall thickness of seamless tubing varies materially in different tubes. Consequently, the final wall thickness is not always the same even though the internal dimensions may be exactly the same. Therefore after the tube has been tapered and sized as above described it is reduced to final exact dimensions throughout by machining the exterior to an exact relation to the sized interior. This gives a wall thickness of predetermined dimensions at all points. This final machining to a fixed relation to a sized interior is not a part of the present invention, having been previously known and practiced. It is not therefore illustrated or described in detail.

The tip of the blank may be closed in any suitable manner, as by spinning, to remove excess metal and to give exact wall thickness. The blank is then deformed to give it the desired airfoil and blade contour. These steps form no part of this invention, and therefore need not be here described. The degree of taper may vary according to the particular style and size of blade being produced.

The invention is particularly applicable to the production of steel blanks, although it is applicable to other metals. It is preferred to conduct both the preliminary sinking and the final swaging operations cold. The die-sinking operations work the metal severely, and it is in general necessary to anneal, or in the case of steel, to normalize, the blank following reduction in each die, in order to avoid injury to the metal at a subsequent stage of the process.

As a specific example of the practice of the invention, there may be mentioned the production of propeller blade blanks from chrome-molybdenum steel tubes about four feet in length, with an outside diameter of 5.1 inches and a wall thickness of 0.25 inch. These tubes are subjected to cold-sinking in a series of six dies, such as those shown in Figs. 4 to 4e. Die 3 has an inlet opening of 5.1 inches, corresponding to the outside diameter of the blank, and its outlet opening is 4.5 inches, this being also the inlet size of die 3a. The outlet of die 3a is 4 inches in diameter, that of die 3b 3.5 inches in diameter, of die 3c 3 inches in diameter, of die 3d 2.5 inches in diameter, and of die 3e 2 inches.

After reduction in each of the sinking dies the steel blank is normalized by heating it to about 1650° F., cooling it below the critical point, i. e. to about 1200° F., in the furnace, and then air-cooling it, when it is ready for the next reducing operation. No intermediate annealing or normalizing treatment is necessary after the first of the final swaging operations, because there each section of metal is worked but once.

The tapered reduction is conducted over a distance of approximately 17 inches from the end of the tube. There is now inserted in the step-reduced blank a mandrel having a tapered tip 19.5 inches in length dimensioned to produce the desired internal taper in the blank. This contacts with the tube in substantially the manner shown in Fig. 5. The blank is then swaged in a series of three tapered dies, such as those shown in Fig. 7. Swaging die 8b has an inlet opening of 5.1 inches and an outlet opening of 4.0 inches, which corresponds to the inlet of die 8a. The outlet of die 8a and the inlet of die 8 is 2⅞ inches, while the outlet of the latter is 1⅞ inches. In the swaging operation the 17-inch step-taper is elongated to approximately 19.5 inches. The metal varies uniformly in wall thickness from an exterior diameter of 5.1 inches at its larger end to an exterior diameter of 1⅞ inches at its tip. The wall thickness of the tube increases slightly during the sinking and swaging operations, but this change in thickness does not prevent the interior taper being smooth, uniform, and accurately dimensioned, and such excess is removed in final exterior machining.

According to the provisions of the patent statutes, I have explained the principle and mode of practicing my invention and have illustrated and described what I now consider to represent its best embodiment. However, I desire to have it understood that, within the scope of the appended claims, the invention may be practiced otherwise than as specifically illustrated and described.

I claim:

1. A method of forming a tapered blank from a tube, comprising reducing one end of the blank radially and progressively in tapered steps of decreasing diameter, inserting in the blank a tapered mandrel having an exterior of dimensions desired for the interior of the blank, swaging the blank on the mandrel in ring dies and thereby converting its stepped reduced portion to a smooth taper interiorly conforming in shape and dimensions to the mandrel taper.

2. A method of making tapered hollow metallic propeller blade blanks, comprising the steps of progressively reducing one end of a metallic tube radially in steps of successively decreasing diameter to form a stepped tapered portion, and then swaging said portion over a mandrel having a tapered tip inserted in said stepped portion and thereby conforming the interior of the stepped portion to said mandrel.

3. A method of making tapered hollow metallic propeller blade blanks, comprising the steps of progressively and radially reducing one end of a metallic tube to form a series of tapered steps of successively decreasing diameter conforming generally to the desired taper, and then swaging the stepped portion over a mandrel having a tapered tip inserted in said portion and thereby smoothing the stepped portion to the mandrel taper.

4. A method of making tapered hollow metallic propeller blade blanks, comprising reducing one end of the blank radially and progressively in steps of decreasing diameter to form a stepped portion conforming generally to the desired taper, inserting in the blank a mandrel having a tapered tip which contacts at spaced intervals with said portion to form intervening pockets, and die-swaging the blank on the mandrel, and thereby smoothing said stepped portion to a uniform taper accurately sized interiorly.

5. A method of making tapered hollow metallic propeller blade blanks, comprising the steps of sinking one end of a hollow cylindrical blank progressively in a series of dies of successively decreasing size to form a stepped portion conforming generally to the desired taper, inserting in the blank a mandrel having a tapered tip dimensioned to produce the desired taper and contacting with the stepped portion at spaced intervals, and swaging the stepped portion over said mandrel to plastically convert it to a smooth taper of substantially accurate internal size.

6. A method of making tapered hollow metallic propeller blade blanks, comprising the steps of die sinking one end of a hollow cylindrical blank progressively to form a series of tapered steps conforming generally to the desired taper, inserting in the blank a mandrel having a taper productive of that desired, and die-swaging the stepped portion over said mandrel to plastically conform said stepped portion to the mandrel and form a smooth taper of substantially accurate internal size.

7. A method of making tapered hollow metallic propeller blade blanks, comprising the steps of die sinking one end of a hollow tube progressively and radially to form a series of tapered steps conforming generally to the desired taper, inserting in the blank a mandrel having a tapered tip contacting the stepped portion at spaced intervals to leave intervening pockets, and die swaging the stepped portion over said mandrel to plastically conform said portion smoothly and accurately to the taper of the mandrel.

8. A method of making tapered hollow metallic propeller blade blanks, comprising the steps of sinking one end of a hollow metallic tube progressively in a series of dies to reduce the tube radially in steps of progressively decreasing diameter and form a stepped portion conforming generally to the desired taper, and then swaging said portion in a series of dies over an interior tapered mandrel the dimensions of which correspond substantially to the internal taper desired, the mandrel contacting the stepped portion at spaced intervals forming pockets for ready flow of metal in swaging, and thereby smoothing and accurately sizing said portion interiorly to the desired taper.

9. A method of making tapered hollow metallic propeller blade blanks, comprising the steps of sinking one end of a hollow cylindrical blank progressively in a series of progressively smaller tapered dies to form a stepped portion conforming generally to the desired taper, inserting in the blank a mandrel uniformly tapered and contacting the steps of said portion at spaced intervals forming pockets for ready flow of metal, and swaging said portion over the mandrel in successive tapered swaging dies, said swaging dies and mandrel cooperating to conform the metal smoothly to an accurately sized taper.

10. A method of making tapered hollow metallic propeller blade blanks, comprising the steps of sinking one end of a hollow cylindrical blank progressively in a series of progressively smaller dies to form a stepped portion conforming generally to the desired taper, the inlet of the first die being substantially equal to the diameter of the blank, and the inlet of each succeeding die being substantially equal to the outlet of the next preceding die, inserting in the blank a mandrel uniformly tapered to substantially the dimensions of the desired interior taper and contacting with the steps of said portion at spaced intervals to form pockets for ready flow of metal, and swaging over the mandrel in successive tapered swaging dies the inlets and outlets of which are related in the manner of said sinking dies, said swaging dies and mandrel cooperating to conform the metal smoothly to an accurately sized taper.

11. A method of making tapered hollow metallic propeller blade blanks, comprising the steps of progressively reducing one end of a hollow steel tube radially in a series of dies of progressively decreasing size, to form a stepped portion conforming generally to the desired taper, normalizing the structure after treatment in each die, and swaging the stepped portion over a tapered mandrel inserted in said portion and contacting it at spaced intervals with intervening pockets, to plastically conform said portion smoothly and accurately to the taper of the mandrel.

12. A method of producing tapered tubular blanks, comprising inserting an end of a tube into a tapered ring die, driving the tube through the die to desired position, then removing the die and driving the reduced cylindrical portion of the blank through a second tapered die until the tapered step produced thereby is substantially continuous with the tapered steps produced by the first die, and so on with successive smaller dies until the desired external taper is produced, then inserting in the blank a tapered mandrel of external dimension desired for the interior of the blank, then forcing a second set of tapered ring dies over the tapered portion of the blank supported by the mandrel to force the metal of the tapered portion of the blank to conform interiorly to the tapered portion of the mandrel.

13. The method set out in claim 12, further characterized by making each step of the tapered portion of the blank of slightly less taper as compared to that of the preceding larger step.

JOHN KENNETH JAMISON.